(12) United States Patent
Kress (10) Patent No.: US 11,435,992 B2
(45) Date of Patent: Sep. 6, 2022

(54) COMMUNICATIONS REGISTRY AND GOVERNANCE FOR APPS

(71) Applicant: T-Mobile USA, Inc., Bellevue, WA (US)

(72) Inventor: Darren Kress, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/998,998

(22) Filed: Aug. 20, 2020

(65) Prior Publication Data
US 2022/0058010 A1 Feb. 24, 2022

(51) Int. Cl.
| | |
|---|---|
| G06F 9/44 | (2018.01) |
| G06F 8/61 | (2018.01) |
| H04L 9/40 | (2022.01) |
| G06F 9/445 | (2018.01) |
| H04L 47/80 | (2022.01) |

(52) U.S. Cl.
CPC ............ *G06F 8/61* (2013.01); *G06F 9/44505* (2013.01); *H04L 47/803* (2013.01); *H04L 63/10* (2013.01)

(58) Field of Classification Search
CPC ........................................................ G06F 8/61
USPC ........................................................ 717/178
See application file for complete search history.

(56) References Cited

U.S. PATENT DOCUMENTS

| | | | |
|---|---|---|---|
| 6,546,554 B1 | 4/2003 | Schmidt et al. | |
| 7,188,179 B1 * | 3/2007 | Hanson | H04L 12/5692 709/227 |
| 7,428,746 B2 * | 9/2008 | Engle | H04L 63/0272 709/219 |
| 7,676,556 B2 * | 3/2010 | Goldstein | H04L 67/36 709/220 |
| 7,921,335 B2 * | 4/2011 | Kiefer | G06F 11/2294 714/46 |
| 9,104,519 B1 * | 8/2015 | Newstadt | G06F 8/65 |
| 10,594,505 B2 * | 3/2020 | Chu | H04L 49/201 |
| 10,616,362 B2 * | 4/2020 | Wang | G06F 16/909 |
| 10,782,951 B2 * | 9/2020 | Ayers | G06F 8/61 |
| 10,861,116 B1 * | 12/2020 | Onstad | G06Q 50/205 |

(Continued)

FOREIGN PATENT DOCUMENTS

KR 20110123867 A 11/2011

OTHER PUBLICATIONS

International Patent Application No. PCT/US2021/046216, Search Report and Written Opinion dated Nov. 11, 2021, 8 pages.

*Primary Examiner* — Evral E Bodden
(74) *Attorney, Agent, or Firm* — Han Santos, PLLC (57) ABSTRACT

A mobile device app may be provided with a communications registry describing network-based resources with which the app would like to communicate, including Internet Protocol (IP) addresses and Universal Resource Locators URLs of the network-based resources, for example. A local firewall on the mobile device allows the app to only communicate with the defined network-based resources in the communications registry. A user is presented with the communications registry prior to accepting download or installation. The user is thus alerted to which external resources are necessary to operate the app and which ones are not. Users would be warned when requested communication permissions are overly broad or relate to known threat locations. A threat score may be provided to users for self-mitigation.

19 Claims, 6 Drawing Sheets

(56) References Cited

U.S. PATENT DOCUMENTS

| | | |
|---|---|---|
| 10,938,864 B2* | 3/2021 | Hancock ............. H04L 65/1069 |
| 10,972,528 B2* | 4/2021 | Cheng .................. G06Q 20/384 |
| 2009/0199012 A1 | 8/2009 | Yamada et al. |
| 2010/0081417 A1 | 4/2010 | Hickie |
| 2012/0252405 A1 | 10/2012 | Lortz et al. |
| 2013/0304718 A1* | 11/2013 | Sadhukha ................ G06F 8/30 707/706 |
| 2014/0380414 A1 | 12/2014 | Saidi et al. |
| 2015/0193225 A1 | 7/2015 | Brunsman et al. |
| 2017/0255457 A1 | 9/2017 | Falkenburg et al. |
| 2019/0340360 A1 | 11/2019 | Kulkarni et al. |

* cited by examiner

FIG. 6

COMMUNICATIONS REGISTRY AND GOVERNANCE FOR APPS

BACKGROUND

Computing devices in general and mobile devices in particular run a variety of applications ("apps") that range from simple to complex. Prior to installation, many apps request permission to access data or resources on the mobile device. Permission must be granted by the user prior to installation in some instances.

DETAILED DESCRIPTION

Techniques of various embodiments are described to implement a communications registry and the governance of external communications requested by apps as a condition of their downloading, installation, and/or use while still retaining the ability to download, install, and use the app with permissions selected, e.g., by a user, and overcome constraints that mobile devices commonly face for app downloading, installation, and/or use. The techniques described herein, while considered particularly advantageous in a mobile environment, nonetheless may be applicable, in whole or in part, to some stationary computing devices, and potentially even those having large form factors. Accordingly, throughout the present description, terms such as "device" and "mobile device" should be considered interchangeable and include such stationary computing devices unless otherwise specified or evident from the description.

In accordance with some embodiments described herein, apps have manifest files (the "manifest") that describe a set of files to be installed by the software installer and metadata that describe the app to the operating system. Among other contents of the manifest are addresses or links to various resources external to the mobile device, resources that the app may access given permission by a selection, e.g., via the mobile device. These addresses may be compiled into a communications registry of permissions to communicate with the resources. Access to some or all of the resources may be necessary for the app to function as intended for its advertised purpose, and some or all may not be necessary or even desirable.

In some embodiments the app may be downloaded to be used on the mobile device. In other embodiments, the app may be present on the device as purchased. In either case, the addresses or links thereto may be presented to the user of the mobile device for selection before or during installation and, in the case of an app that is to be downloaded, the permissions may be presented and/or selected by the user before downloading. The device may offer a comprehensive view of the mobile device's platform, all services on the device, and/or all apps on the device, and their associated communications registries, with the ability to filter the view based upon various criteria. In some examples, the filter may restrict the view of each communications registry to only addresses or links of a certain category or range, or of the platform/services/apps, or any of these. In this way, the communications registries offer transparency to the user and control over the communications by the platform/services/apps beyond the mobile device, which enhance the security of the mobile device without sacrificing functionality.

Figure 1:
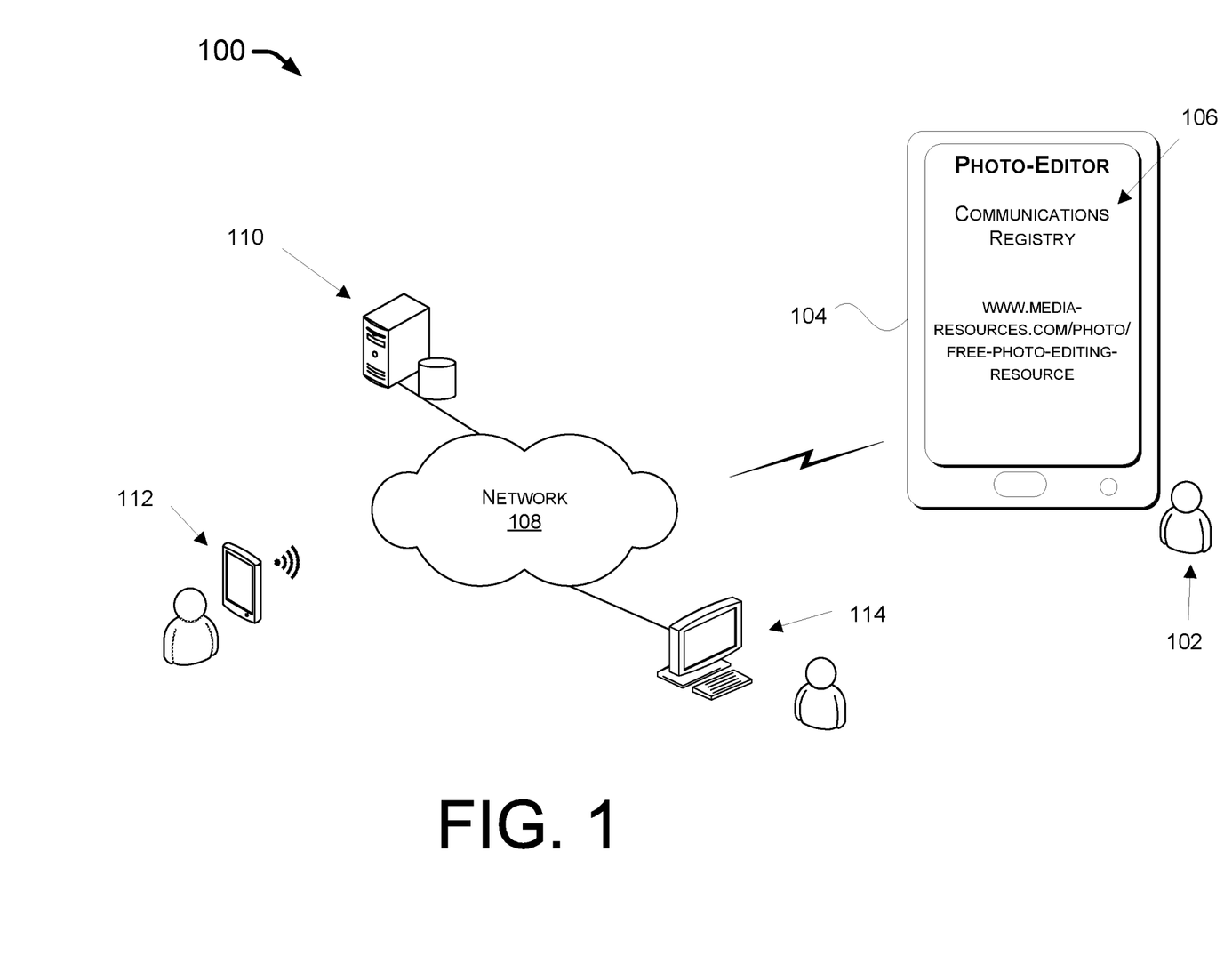
FIG. 1 illustrates an example system to implement restrictions on external communications requested by an app.

FIG. 1 illustrates an example system 100 to implement restrictions on external communications requested by an app. In FIG. 1, a user 102 has a mobile device 104. In some embodiments, the mobile device is configured to display one or more communications registries, such as the communication registry 106 for a photo-editing app named PhotoEditor. The communications registry 106 describes resources for which a platform, service, or app professes a need. In some embodiments, the resources are obtained from an addressable endpoint on a network, using for example a Universal Resource Locator (URL) or Internet Protocol (IP) address (or hyperlinks thereto) over the Internet. One or more communications registries may be presented at a time via a user interface, and/or active without being currently presented.

The mobile device 104 is configured to communicate over a communication network 108 with one or more entities including, without limitation, a server 110, another mobile device 112, and a desktop device 114.

The mobile device 104 may be a smartphone, a smartwatch, a tablet computer, a phablet computer, or any other computing device that is capable of communicating with other devices directly or via the communication network 108.

In some embodiments, the communication network 108 includes a telecommunication carrier network which may include a core network of a mobile network operator (MNO). The telecommunication carrier network may be a cellular network and the MNO a cellular provider. In some embodiments, one or more of the mobile device 104, the server 110, the mobile device 112, and/or the desktop device 114 may communicate with the communication network 108 via a wired connection, a wireless access point, and/or a telecommunication carrier's mobile network, or via a hybrid network that includes one or more of these.

In one or more embodiments, the communication network 108 may be a cellular network, and may provide telecommunication and data communication in accordance with one or more technical standards, such as 2G/2.5G technologies such as Enhanced Data Rates for GSM Evolution (EDGE), 3G technologies such as Wideband Code Division Multiple Access (W-CDMA) and CDMA-2000 (Code Division Multiple Access 2000), 4G technologies such as High Speed Packet Access (HSPA) and Long Term Evolution (LTE), and 5th Generation (5G) wireless systems such as 5G NR, and/or so forth.

In 4G and later embodiments, the core network may include an IP Multimedia Subsystem (IMS) core. The IMS core may be accessed via one or more gateways and related components that are tasked with providing connectivity between the telecommunication carrier network and mobile devices such as the mobile device 104, by acting as a point of entry and exit for data traffic. In turn, the IMS core may provide the mobile devices with data access to external packet data networks, such as the networks of other telecommunication carrier networks or the Internet.

The core network also may include one or more application servers, including without limitation an enterprise information technology (EIT) server, to implement application servers and perform back end processing for network connectivity for the MNO.

The server 110 may be an application server or other source of applications that can be downloaded to the mobile device 104. Such a server may either be a physical dedicated server or a virtual machine. In the latter case, the server 110 may represent a plurality of disaggregated servers which provide virtual application server functionality and virtual storage/database functionality, e.g., in a cloud network. The disaggregated servers may incorporate physical computer servers.

The mobile device 112 and the desktop device 114 represent endpoints that may communicate with the mobile device 104 directly (e.g., peer-to-peer) via a wired or wireless connection or indirectly via the communication network 108. The mobile device 112 may be configured similarly to the mobile device 104.

Figure 2:
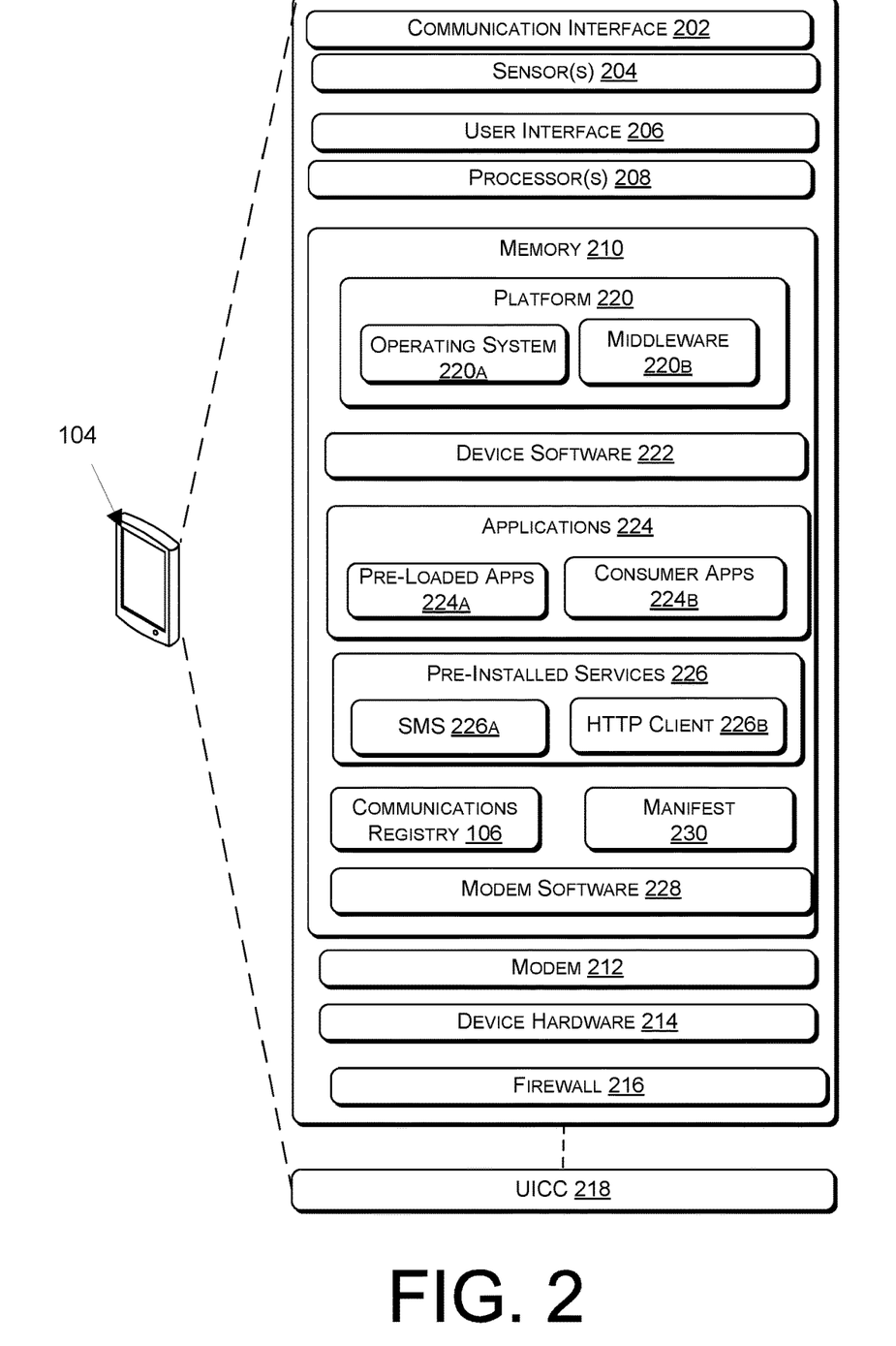
FIG. 2 illustrates an example of a mobile device.

FIG. 2 illustrates an example of the mobile device 104. The mobile device 104 may include a communication interface 202, one or more sensors 204, a user interface 206, one or more processors 208, memory 210, a modem 212, other device hardware 214, and a firewall 216. The communication interface 202 may be a network interface card supporting Ethernet and/or Wi-Fi™ and/or any number of other physical and/or datalink protocols that enable the mobile device 104 to transmit or receive voice or data communication via the communication network 108, as well as other telecommunication and/or data communication networks. Where the communication network 108 is a cellular network, the communication interface 202 will include a cellular radio and radio access software layer. The one or more sensors 204 may be in the form of one or more cameras capable of capturing still images and/or video and/or one or more microphones or transducers to capture audio. Non-multimedia sensors include without limitation proximity sensors (an example of which may detect movement or determine a proximity of the mobile device 104 to a surface such as a user's head), global positioning system (GPS) sensors, ambient light sensors, one or more accelerometers, a compass, an altimeter, one or more gyroscopes, and backlight illuminated sensors.

The user interface 206 may enable a user to provide input and receive output from the mobile device 104, including for example providing one or more input to select device resources or resources external to the device. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The one or more processors 208 may comprise a central processing unit and/or a dedicated controller such as a microcontroller. The one or more processors 208 and the memory 210 of the user device 104 may implement a platform 220 (e.g., Android, Apple, Internet of Things (IoT)), device software 222, one or more applications 224, one or more pre-installed services 226, and modem software 228. The various software and applications may include routines, program instructions, objects, and/or data structures that perform particular tasks or implement particular abstract data types.

The memory 210 may be implemented using computer-readable media, such as computer storage media. Computer-readable media include, at least, two types of computer-readable media, namely computer storage media and communications media. Computer storage media include volatile and non-volatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory or other memory technology, compact disc read-only memory (CD-ROM), digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The modem 212 is a hardware component that enables the mobile device 104 to perform telecommunication and data communication with the communication network 108. The device hardware 214 may include other hardware that is typically located in a mobile telecommunication device. For example, the device hardware 214 may include signal converters, antennas, hardware decoders and encoders, graphic processors, a Universal Integrated Circuit Card (UICC) slot (e.g., SIM slot) to receive a UICC 218, and/or the like that enables the mobile device 104 to execute applications and provide telecommunication and data communication functions. The firewall 216 is software and/or hardware that filters communications via the communication interface 202 or the modem 212 and allows or blocks communications based on rules. The UICC 218 may be an integrated circuit chip that is inserted into the UICC slot of the mobile device 104, or an embedded UICC that is hardwired into the circuit board of the mobile device 104.

The platform 220 may include one or more of an operating system 220a and middleware 220b. The operating system 220a may include components that enable the mobile device 104 to receive and transmit data via various interfaces (e.g., user controls, communication interface 202, and/or memory input/output devices). The operating system 220a may also process data using the one or more processors 208 to generate outputs based on inputs that are received via the user interface 206. For example, the operating system 220a may provide an execution environment, such as a Java Virtual Machine or Microsoft's Common Language Runtime(™), for the execution of the applications 224. The operating system 220a may include a presentation component that presents the output (e.g., displays the data on an electronic display, stores the data in memory, transmits the data to another electronic device, etc.).

The operating system 220a may further include an interface layer that enables applications to interface with the modem 212 and/or the communication interface 202. The interface layer may comprise public application programming interfaces (APIs), private APIs, or a combination of both public APIs and private APIs. Additionally, the operating system 220a may include components that perform various other functions generally associated with an operating system. The device software 222 may include software components that enable the mobile device 104 to perform functions. For example, the device software 222 may include a basic input/output system (BIOS), Boot ROM, or a bootloader that boots up the mobile device 104 and executes the operating system 220a following power up of the device.

The applications 224 may include applications that provide utility, entertainment, and/or productivity functionalities to a user of the mobile device 104. For example, the applications 224 may include telephony applications, electronic mail applications, remote desktop applications, web browser applications, navigation applications, office productivity applications, multimedia streaming applications, gaming applications, and/or so forth. In some embodiments, the applications 224 may include one or more pre-loaded applications 224a and one or more consumer applications 224b, which may be pre-loaded or later installed.

The one or more pre-installed services 226 may include, without limitation, short message service (SMS) service software 226a and hypertext transfer protocol (HTTP) service client 226b. The SMS service software 226a may provide the mobile device 104 with the ability to send and receive SMS messages from a Short Message Service Center (SMSC), such as an SMS server that resides on the communication network 108. In various embodiments, the transmission of messages between the SMSC and the SMS service software 226a may be performed according to the Mobile Application Part (MAP) of the Signaling System 7 (SS7) protocol. The size of the SMS messages may be constrained by the protocol to 140 octets or 1120 bits. The SMS messages may be encoded using a variety of alphabets, such as the Global System for Mobile Communications (GSM) 7-bit alphabet, the 8-bit data alphabet, the 16-bit Universal Coded Character Set-2 (UCS-2) alphabet, and/or so forth. In some embodiments, the SMS messages that are passed between the SMS service software 226a and the SMSC may be encrypted and decrypted by both parties according to the Secure Channel Protocol 80 (SCP80) OTA secure channel protocol, or another equivalent secure SMS communication protocol.

The HTTP service client 226b may enable the mobile device 104 to establish a communication session with a server, such as a web server or a file service, using HTTP. The server 110 is an example of such a server. HTTP is an application layer protocol that uses an underlying transport layer protocol, such as the Transmission Control Protocol (TCP), the User Datagram Protocol (UDP) and/or so forth. HTTP is a request-response protocol, in which the HTTP service client 226b may submit a HTTP request message, and the server may respond with a requested resource in a response message to the HTTP service client. In some embodiments, the HTTP service client may also use the HTTP Secure (HTTPS) protocol to communicate with a server, in which the communication session is encrypted by a security protocol, such as the Secure Socket Layer (SSL) protocol, the Transport Layer Security (TLS) protocol, and/or so forth.

The platform 220, applications 224, and pre-installed services 226 may be comprised of software components. In general, a software component is a set of computer-executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

The modem software 228 may drive the modem 212 to perform telecommunication and data communication with the communication network 108. The modem software 228 may be firmware that is stored in dedicated non-volatile memory of the mobile device 104. Such non-volatile memory may include (ROM) ROM, erasable programmable read-only memory (EPROM), or flash memory.

The communications registry 106 is a registry of one or more locations of, e.g., network-based resources to which a platform, service, and/or app requests permission to communicate. For example, one or more of the platform 220, pre-installed service(s) 226, and/or app(s) 224 has a communications registry 106. In this description, "app 224" will be used for convenience, it being understood that the platform 220, one or more service(s) 226, and/or one or more app(s) 224 is also meant unless inapt. The permissions may be selected or deselected by a user via the user interface 206.

As mentioned, the manifest describes a file or set of files to be installed by the software installer and metadata that describe the app to the operating system. An example is manifest 230. For each app component, a corresponding Extensible Markup Language (XML) element is declared in the manifest 230: The manifest 230 is independent of the firewall 216.

The manifest 230 may describe components of the app 224, including and without limitation activities, services, and content providers. The manifest 230 may contain permissions that the app 224 uses in order to access or permit access from protected areas of the mobile device 104 or other apps 224, and/or hardware and software features the app requires for installation. The app developer can make the manifest 230, or it can be autogenerated by the app 224 at installation.

Among other contents of the manifest 230 are the addresses or links to the various network-based resources external to the mobile device 104, resources that the app may access given permission by a selection, e.g., via the mobile device 104. In some embodiments, the selection is made by the user via the user interface 206. Access to some or all of the resources may be necessary for the app to function as intended for its advertised purpose; some or all of the resources may not be necessary or even desirable. Moreover, some or all of the addresses may have no actual resources sought by the user; one or more of the addresses may lead to nefarious servers or other endpoints which may, in response to the reach-out by the mobile device 104, send back malware to access sensitive data or areas within the mobile device 104, or obtain information from the reach-out itself that the user may not want to divulge.

The manifest 230 may include permissions for the app to access data from other apps on the mobile device 104. In some embodiments, the manifest 230 includes permissions required for the app to communicate with resources over a communication channel using addressing according to a defined protocol. For example, and without limitation, the resources may be accessed by a Universal Resource Locator (URL) or Internet Protocol (IP) address. The platform 220 may refer to the app's manifest 230 and extract the permissions for presentation via the user interface 206, along with a threat score in some embodiments, as described elsewhere herein. The threat score may originate with a network service provider, a business entity (e.g., a security company, social networking site, or consumer protection service), a government entity (e.g., the Department of Homeland Services, a platform provider (e.g., Apple or Google), or an original equipment manufacturer (OEM), for example.

A platform's manifest is generally limited to communicating with the app manifest for updates, other apps, and/or the like. For example and without limitation, the Android operating system may need access to the mobile device's OEM or Google (primary developer) for access to software updates or certain apps.

Thus, one or more of the apps 224 communicate externally with only those resources to which permission has been granted (by selection or by not being deselected) by the user 102. In instances of deselection, the user may be warned of possible adverse effects before a permission is removed. All other external communication in the communications registry 106 is prevented, limiting the ability to compromise the mobile device 104 by an unknown or unauthorized resource, and for an already-compromised app to communicate with a resource that was not previously defined and/or accepted by the user 102. In the end, users would be inclined to select less risky apps and services and developers would be motivated to restrict communications to only required resources, knowing that risky attempts would be visible to the user. These measures would enhance the security of the broad mobile ecosystem.

In some embodiments, the communications registry 106 is not static. For example, as updates are developed, the updates may be pushed to the mobile device 104 and presented in a manner similar to the presentation of the communications registry 106 at download or installation as described herein. Additionally, or alternatively, a notification may be sent to the user 102 via the app 224, app source (e.g., app store), or otherwise that an update is available, in response to which the user 102 may pull the updates as desired. The pull option may also be made available without a notification, e.g., by the user 102 inquiring into available updates. In all of these instances, the user 102 is made aware of the changes and any associated risks (unless previously auto-authorized), requiring developers to be transparent with their updates as well as with the initial download and/or installation.

Alternatively, permissions presented for the user's authorization may be presented prior to updating the communications registry 106, which is updated or recreated in accordance with the user's selections. In some embodiments, the user 102 may preapprove updates to previously approved permissions and, additionally or alternatively, reject in advance permissions previously rejected. In the same or other embodiments, the user 102 may have the option of changing his selections and/or modifying them so that a resource with which the app seeks to communicate may be changed to another address or location. An example is a virtual private network (VPN) app that may maliciously set up the VPN. In such cases, the user 102 is given notice of unwanted presence on the VPN and is able to deny access by the app.

As configured, the platform 220 supported by the one or more processors 208 may enforce permissions selected by the user 102 via the user interface 206 and/or based on prior settings, which may have been carried over from previous installations or updates of the same app 224, permissions selected for similar apps, or permissions set for the mobile device 104 and every app 224 installed on it. For example, the communications registry 106 may show previously deselected permissions in one color such as gray and selected permissions (or permissions not yet selected or deselected) in blue. In some embodiments, when the permissions are presented for a previously installed app, the user 102 can see which permissions were previously deselected, whether in the current app 224 or another app, or universally set for all apps.

In some embodiments, the platform 220 may provide the user 102 with information as to the safety of the app 224 or of a specific potential risk or risks. For example, an app 224 that seeks permission to communicate with the source of a known threat or threats, or that is requesting access to an overly broad range of addresses (which may be defined in advance), may represent an unacceptable risk. An extreme example of an overly broad range of addresses is "all IPv4 addresses;" a smaller but overly broad range may be set as a standard. Other examples include, without limitation, all sources from a particular company, hostile country, or hostile domain. This information can by provided to the user 102 via the mobile device 104 in the form of a specific warning, with or without an explanation, or by a risk score established and/or supplied by the app source or by the platform itself as set by a developer. All such information may become part of the communications registry.

The manifest 230 may describe information about the app 224 to the operating system 220a, to the operating system build tools, and to the app source (e.g., Apple Store or Google Play). In some embodiments, the app source (e.g., app store) from which the app 224 is obtained may provide a risk score or other indication of risk posed by installing the app. The indication may be a number, a symbol, a color, and/or so forth. It may represent a general risk of installation, a specific risk for individual permissions, or an indication of how many risky reach-outs are presented. Additionally or alternatively, the indication may be provided during installation.

An IoT platform that supports apps 224 and services 226 can refer to the manifest 230 and how the manifest 230 is applied. In some embodiments, a user can add restrictions to the manifest 230 for inclusion in the communications registry 106, or open a specified access. For example, an app may have line-item selections as described herein, whereas a browser may have permission to access everything. In other examples (for example, a local game), no external resources may need to be accessed and thus no permissions are offered for selection. Additionally or alternatively, a superuser may be granted unlimited permissions.

Figure 3:
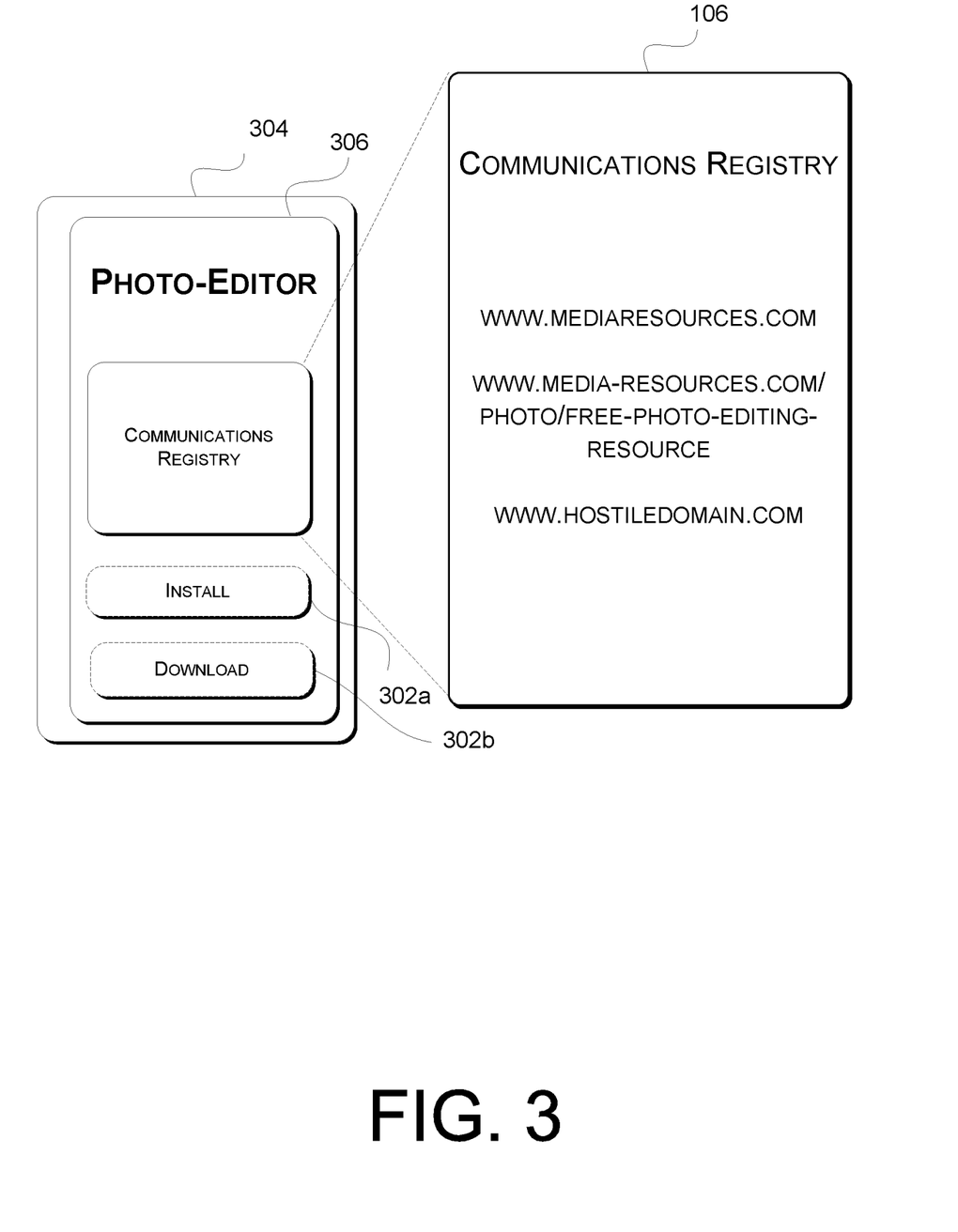
FIG. 3 illustrates an example of a communications registry.

FIG. 3 illustrates an example of the communications registry 106 for the Photo-Editor app introduced in FIG. 1, presented by a mobile device 304 via a user interface 306. In the example shown, the Photo-Editor app has been downloaded and is awaiting installation. To this end, a button 302a is presented, displaying "Install", to install the app on input via the user interface 206. In another, however, a similar scenario may find the communications registry 106 displayed from the app source at the pre-download stage. To this end, a button 302b displays "Download" upon selection by the user 102. Both of the buttons 302a and 302b are presented with a dashed boundary to indicate that they may be displayed in the alternative (i.e., only the appropriate button of the two is displayed depending on whether the app has been downloaded or not downloaded). In some embodiments, both buttons may be displayed simultaneously, with only the appropriate button active (i.e., depending on whether the app has been downloaded or not downloaded), in which case the non-active button may be displayed in gray to indicate that it is not active.

Only to show an illustrative example for the purpose of better understanding FIG. 3, Photo-Editor may be an app that the user 102 can use to reach out to an external server, such as the server 108, to obtain access to free resources for editing photos on the mobile device 104. For example, Photo-Editor may send photos stored on the mobile device 104 to the server 108, or Photo-Editor may pull down editing resources for the user 102 to edit photos directly on her mobile device 104.

As shown by the expanded view of the communications registry 106, URLs for accessing network resources are shown. In the example, three URLs are shown; however, any number of URLs may be presented for the user 102 to consider selecting. Moreover, although URLs are shown, IP addresses may be shown as well or in the alternative.

The three URLs represent locations to which Photo-Editor requests permission to send communications. The first, www.mediaresources.com may sound innocuous. However, it is a broad, top-level domain and the user 102 may consider that the app does not need to access the broad range of locations reached by communicating with that location. Accordingly, the user 102 may consider de-selecting that permission or, as the case may be, not selecting that permission.

The second URL, www.mediaresources.com/photo/free-photo-editing-resources may appear to be not only an expected target (e.g., for access by the app to free photo-editing resources), but safe as well, the URL being appropriately narrow. Accordingly, the user 102 may consider permitting communication with that resource by selecting the link or, as the case may be, not de-selecting the link.

The third URL, www.hostiledomain.com, suggests not only an irrelevant target but a potentially risky one. Accordingly, the user 102 may deny permission for the Photo-Editor app to communicate with that linked address.

Figure 4:
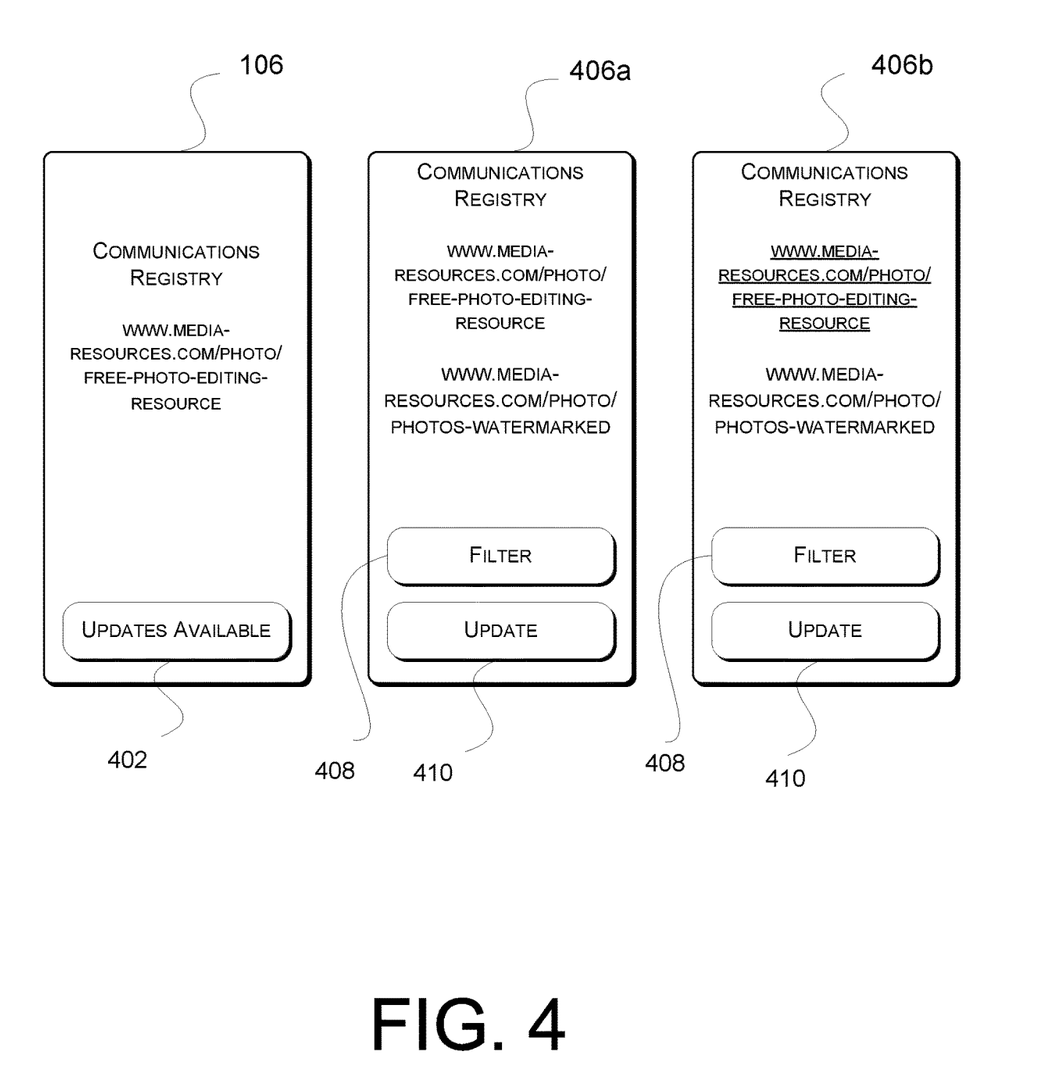
FIG. 4 illustrates examples of the communications registry presenting its contents for possible updating.

FIG. 4 illustrates examples of the communications registry 106 presenting its contents for possible updating. In FIG. 4, communications registry 106 is shown with a button ("Updates Available") 402 as displayed on the user interface, notifying the user 102 that updates are available. In response to the user 102 clicking on the button 402, the communications registry (now designated by reference numeral 406a) shows two updates that are available. The first update points to www.media-resources.com/photo/free-photo-editing-resource, the link to a fictitious address for accessing a free photo-editing resource illustrated above. The second update is a new link to an (also fictitious) address, www.media-resources.com/photo/photos-watermarked. Although not clear from the link, the latter update suggests a photo preview or set of sample photos or the like that are available in watermarked form, potentially requiring payment for the unwatermarked photos. In the communications registry 406a is also shown a filter button 408 that may be used to filter the available updates by any number of preset categories (not shown), and an update button 410 to effect the update with the links shown. For the purposes of this example, the user 102 has selected the first link (to update the corresponding permission already selected for the Photo-Editor app (e.g., pre-download or during installation). The ensuing communications registry 406b shows the result, which in this instance, for illustration only, the selected update is underlined and the non-selected update is not underline. Other forms of indication may be used, such as and without limitation differently colored links (e.g., gray for the deactivated second link), or disappearance of the non-selected link. The filter button and the update button remain in this example, the filter button being active to filter differently the updates available and the update button active to download the updates selected by the user 102.

Figure 5:
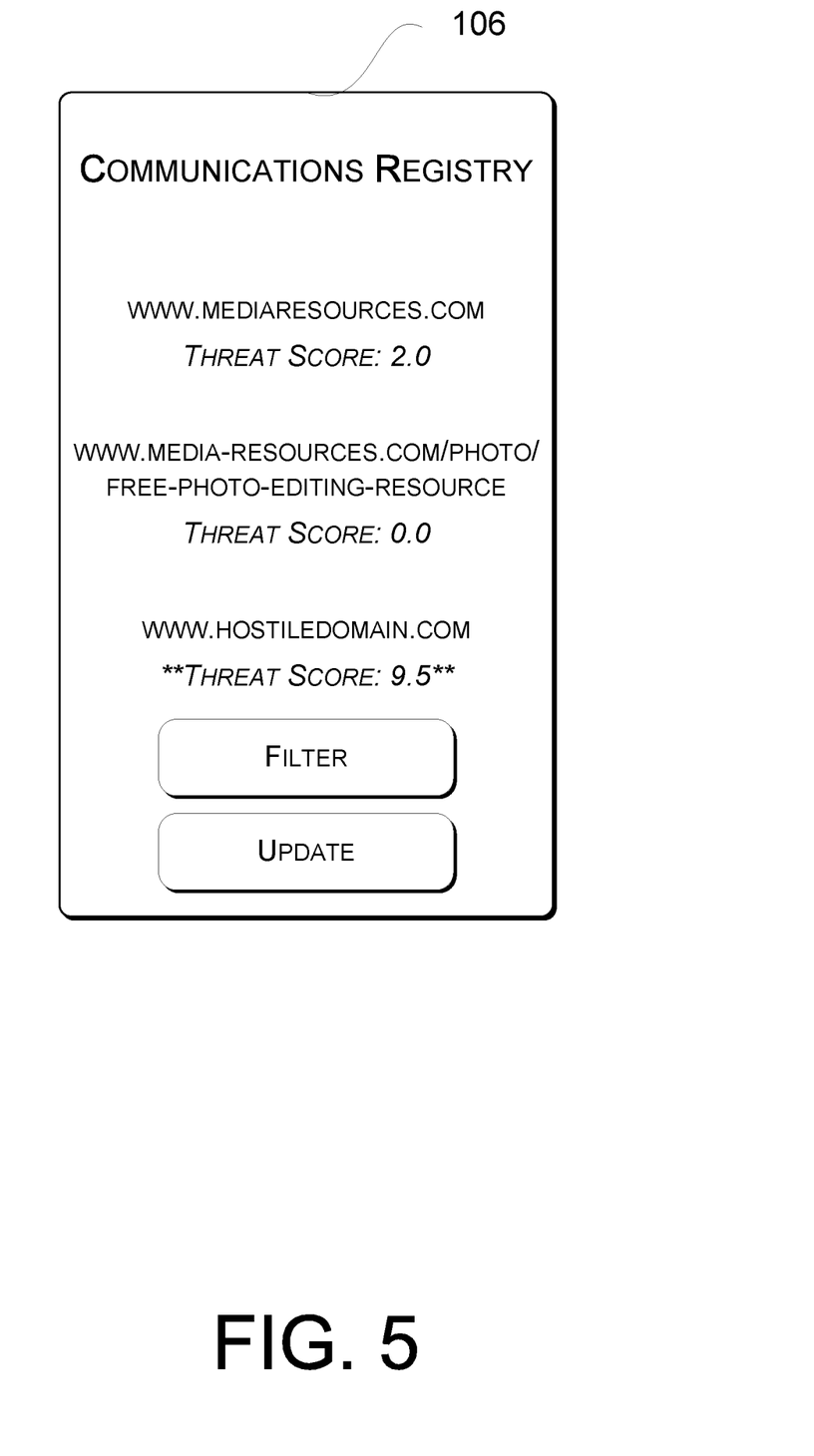
FIG. 5 illustrates examples of the communications registry presenting threat scores for one or more external communication permissions requested by the app.

FIG. 5 illustrates examples of the communications registry 106 presenting threat scores for one or more of the external communication permissions requested by the app 224. For illustrative purposes only, the Photo-Editor app is again used for this description. In FIG. 5, the communications registry 106 includes the three links of the communications registry 406b shown in FIG. 4. Beneath each link is a threat score that may be determined by the platform 220 as set by a developer or by the app source (for example, and without limitation, Google Play or the Apple store), or by other entities including those mentioned herein (e.g., network service provider, business entity, government entity, platform provider, or OEM). The threat score may be based on any of a number of factors, including but not limited to a known threat or threats, requesting access to an overly broad range of addresses (which may be defined in advance), and/or sources from a particular company, hostile country, or hostile domain. The threat score can by provided in the communications registry 106 in the form of a specific warning and numerical score, as shown in FIG. 5, or any other suitable way (for example, and without limitation, a sound, vibration, bar graph, differently colored text, etc.). The threat score may be provided with or without an explanation of the threat (e.g., "Address range is too broad"). All such information may become part of the communications registry.

Figure 6:
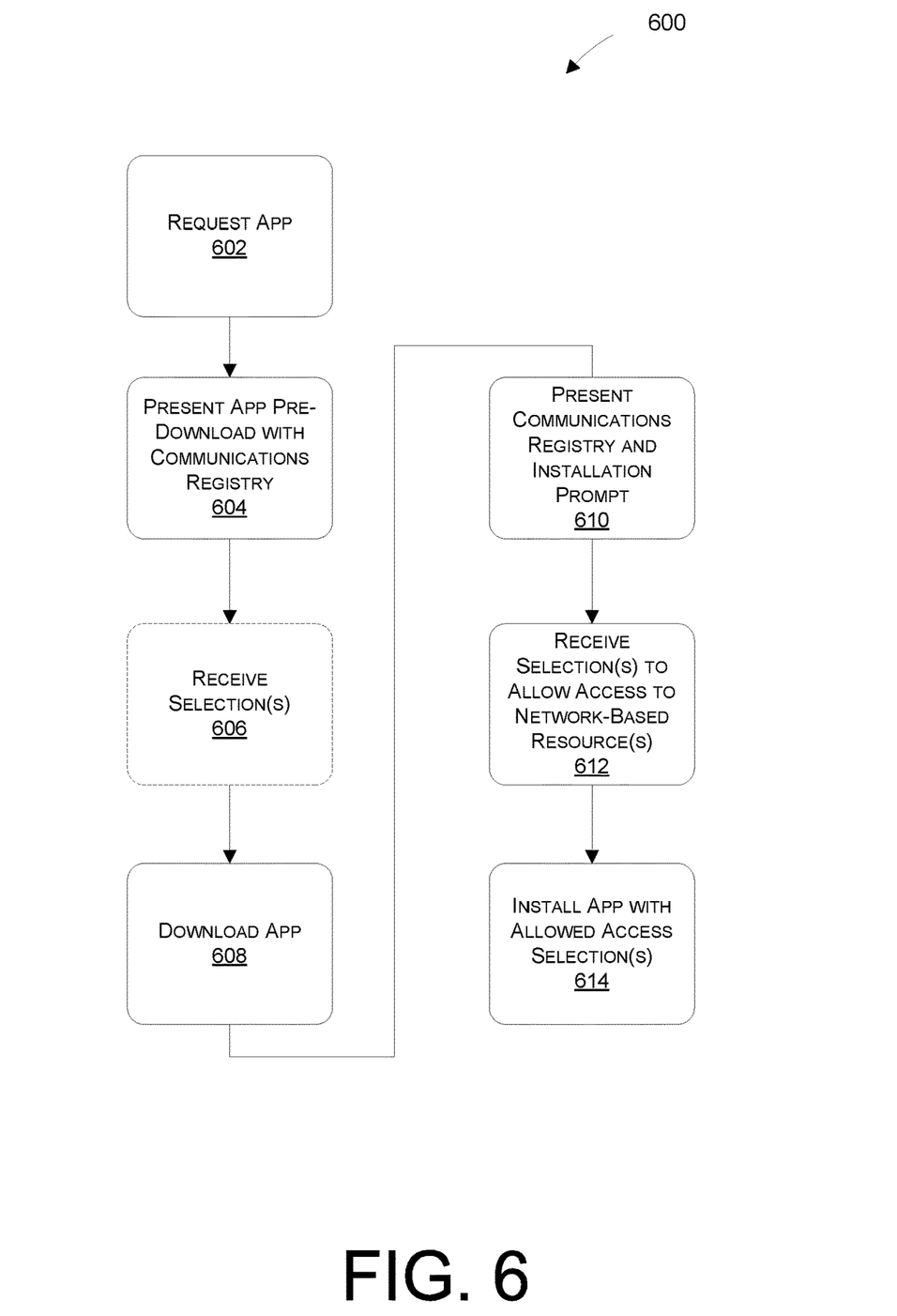
FIG. 6 is a flow diagram of an example process 600 performed at least in part by the mobile device 104 for generating a communications registry

FIG. 6 presents an illustrative process for implementing a communications registry and the governance of external communications requested by apps as a condition of their downloading, installation, and/or use. The process is illustrated respectively as a collection of blocks in logical flow charts, which represent sequences of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to the system 100 of FIG. 1.

FIG. 6 is a flow diagram of an example process 600 performed at least in part by the mobile device 104 for generating a communications registry 106. At Block 602, the mobile device 104 requests an app 224 from an app source. The request may be made by the user 102 or by another app in the mobile device 104. The app source may be an app store, another mobile device such as the mobile device 112, or a location on the communication network 108 such as the server 110 or the desktop 114.

At Block 604, the mobile device 104 presents the app 224 pre-download. In some embodiments, the app may be presented with its communications registry, which may include one or more links to network-based resources. (For purposes of this description, although one or more links and/or addresses and/or other way to a network-based resource may be presented, "links" will be used for brevity to represent all.) In some instances, the user interface 206 displays the app title, logo, and/or other representation of the app 224 via the user interface 206 and/or provides an audible presentation. At this point, the app 224 is ready for downloading.

At Block 606, the mobile device 104 receives any selections of one or more links. The selections may be made by the user 102 via the user interface 206, by another app on the mobile device 104, or otherwise. Block 606 is shown with a dashed outer line to indicate that, if permissions do not need to be granted pre-download, block 606 is not performed.

At Block 608, the mobile device 104 downloads the app 224. In some embodiments, the mobile device 104 downloads the app 224 from, e.g., an app store or other source. "Download" may also include obtaining the app 224 by another way, such as by a peer-to-peer transfer.

At Block 610, the mobile device 104 may present an installation prompt, for example a visual prompt in the form of a word, character, or button, or an audible prompt in the form of a tone or speech, to install the app 224 on the mobile device 104. In some embodiments, the installation prompt is presented via the user interface 206. The installation prompt may be presented pre-download and/or post-download.

At Block 612, the mobile device may receive one or more selections of links to allow communication to access corresponding network-based resources. The selections may be made by the user 102 via the user interface 206, by another app on the mobile device 104, or otherwise.

At Block 614, the mobile device 104 may install the app 224 with permissions that allow the app 224 to communicate with the network-based resources in accordance with the selections.

Techniques are described herein to implement governance of external communications requested by an app as a condition of its installation and/or use on a mobile device using a communications registry, extending firewall capabilities to devices and/or apps while increasing visibility of the resources to which the app is configured to gain access. The teachings herein may also be applicable, in whole or in part, to some stationary computing devices, and potentially even those having larger form factors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device, comprising:
   one or more processors;
   memory storing instructions that are executable by the one or more processors to perform operations comprising:
   receiving an app and a communications registry that defines one or more links to network-based resources with which the app needs permission to communicate, the network-based resources including resources of known threats;
   requesting, prior to installing the app, permission to communicate with the network-based resources by presenting the communications registry, including presenting the one or more links defined therein and respective threat scores corresponding to at least one of the presented links;
   in response to the request for permission, receiving user input selecting one or more of the presented links in the communications registry as permission to communicate with the network-based resources corresponding to the selection;
   granting the app permission to communicate with the network-based resources corresponding to the selection; and
   installing the app with permissions that allow the app to communicate with the network-based resources of known threats corresponding to the selection and without permission to communicate with network-based resources corresponding to unselected links.

2. The device of claim 1, wherein the memory stores a firewall that enforces the communications registry, only permitting the app to communicate with the one or more network-based resources defined in the communications registry.

3. The device of claim 1, wherein:
   the communications registry is activated by the app and displayed via a user interface; and
   the app accepts the user input to select the one or more network-based resources with which the app is permitted to communicate.

4. The device of claim 3, wherein the user input is accepted prior to downloading the app.

5. The device of claim 1, wherein:
   the memory stores plural apps having respective communications registries; and
   the operations comprise presenting a comprehensive view of the plural apps and their respective communications registries.

6. The device of claim 1, wherein the operations comprise:
   presenting the communications registry having one or more update links;
   receiving one or more selections of the update links to update the communications registry; and
   updating the communications registry to include the selected update links.

7. The device of claim 1, wherein the operations comprise:
   determining respective threat scores corresponding to one or more of the links in the communications registry.

8. A non-transitory computer-readable medium storing executable instructions that, if executed by one or more processors in a mobile device, cause the one or more processors to perform operations comprising:
   receiving an app and a communications registry that defines one or more links to network-based resources with which the app needs permission to communicate, the network-based resources including resources of known threats;
   requesting, prior to installing the app, permission to communicate with the network-based resources by presenting the communications registry, including presenting the one or more links defined therein and respective threat scores corresponding to at least one of the presented links;
   in response to the request for permission, receiving user input selecting one or more of the presented links in the communications registry as permission to communicate with the network-based resources corresponding to the selection;
   granting the app permission to communicate with the network-based resources corresponding to the selection; and
   installing the app with permissions that allow the app to communicate with the network-based resources of known threats corresponding to the selection and without permission to communicate with network-based resources corresponding to unselected links;
   wherein the memory stores a firewall that enforces the communications registry, only permitting the app to communicate with the selected one or more network-based resources defined in the communications registry.

9. The non-transitory computer-readable medium of claim 8, wherein the operations comprise:
creating a manifest that includes the contents of the communications registry; and
storing the manifest on the mobile device.

10. The non-transitory computer-readable medium of claim 8, wherein the operations comprise:
receiving notification of an updating of the communications registry;
presenting the communications registry having one or more update links;
receiving one or more selections of the update links to update the communications registry; and
updating the communications registry to include the selected update links.

11. The non-transitory computer-readable medium of claim 10, wherein the operations comprise:
creating a manifest that includes the contents of the communications registry;
storing the manifest on the mobile device; and
updating the manifest in accordance with the updating of the communications registry.

12. The non-transitory computer-readable medium of claim 8, wherein the communications registry is installed during installation of the app.

13. The non-transitory computer-readable medium of claim 12, wherein the communications registry is presented before downloading of the app.

14. The non-transitory computer-readable medium of claim 8, wherein the operations comprise:
determining respective threat scores corresponding to one or more of the links in the communications registry.

15. A method performed on a mobile device, comprising:
receiving an app and a communications registry that includes one or more links to network-based resources with which the app needs permission to communicate, the network-based resources including resources of known threats;
requesting, prior to installing the app, permission to communicate with the network-based resources by presenting the communications registry, including presenting the one or more links defined therein and respective threat scores corresponding to at least one of the presented links;
in response to the request for permission, receiving user input selecting one or more of the presented links in the communications registry as permission to communicate with the network-based resources corresponding to the selection;
granting the app permission to communicate with the network-based resources corresponding to the selection; and
installing the app with permissions that allow the app to communicate with the network-based resources of known threats corresponding to the selection and without permission to communicate with network-based resources corresponding to unselected links;
wherein the memory stores a firewall that enforces the communications registry, only permitting the app to communicate with the selected one or more network-based resources included in the communications registry.

16. The method of claim 15, further comprising:
creating a manifest that includes the contents of the communications registry; and
storing the manifest on the mobile device.

17. The method of claim 15, further comprising:
receiving notification of an updating of the communications registry;
presenting the communications registry having one or more update links;
receiving one or more selections of the update links to update the communications registry; and
updating the communications registry to include the selected update links.

18. The method of claim 17, further comprising:
creating a manifest that includes the contents of the communications registry;
storing the manifest on the mobile device; and
updating the manifest in accordance with the updating of the communications registry.

19. The method of claim 15, further comprising:
determining respective threat scores corresponding to one or more of the links in the communications registry.

* * * * *